C. L. NEWMAN.
PARACHUTE.
APPLICATION FILED JUNE 11, 1921.
1,423,248.
Patented July 18, 1922.
3 SHEETS—SHEET 1.
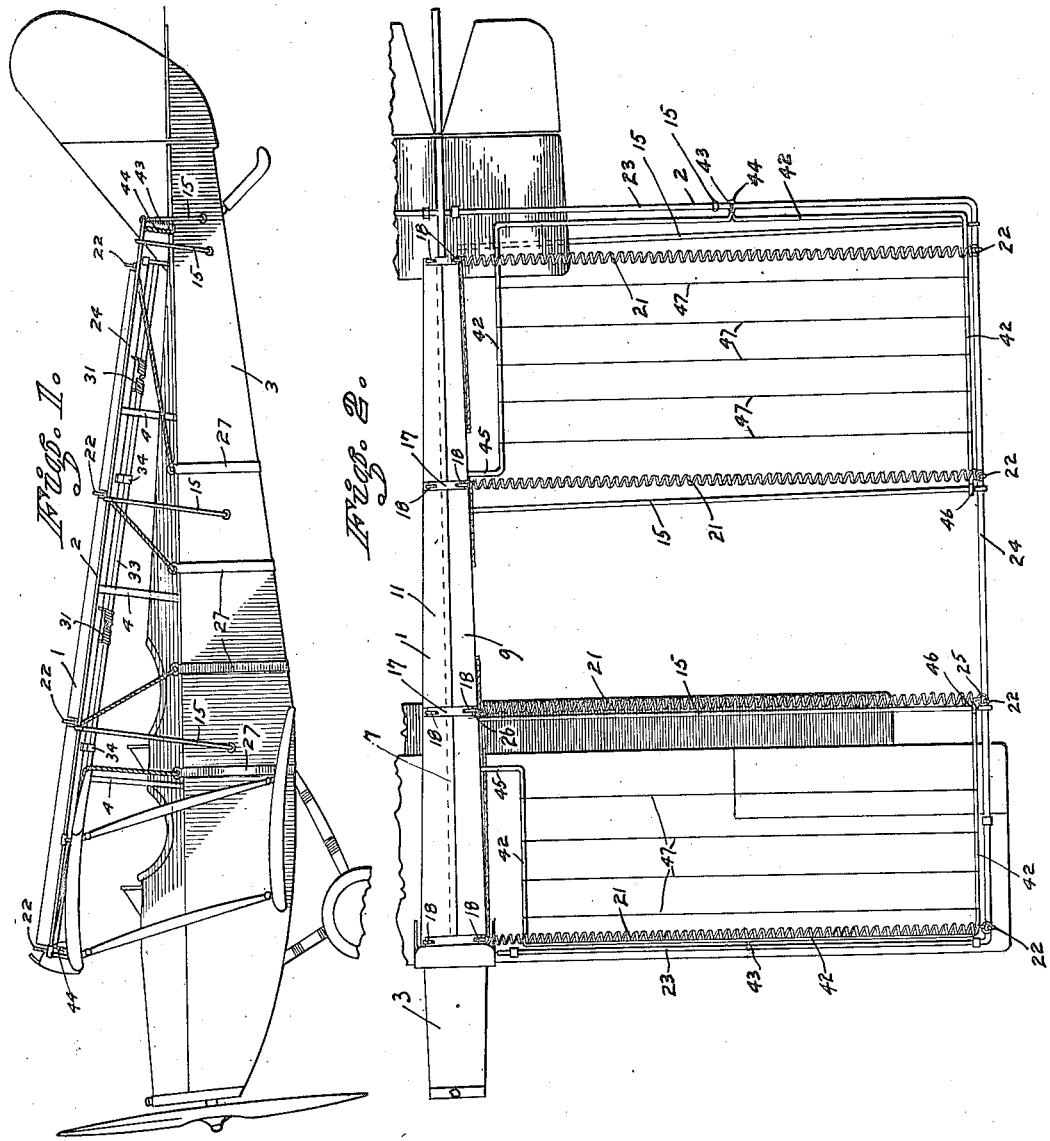
INVENTOR.
C. L. NEWMAN
BY
ATTORNEYS.

C. L. NEWMAN.
PARACHUTE.
APPLICATION FILED JUNE 11, 1921.
1,423,248.
Patented July 18, 1922.
3 SHEETS—SHEET 2.
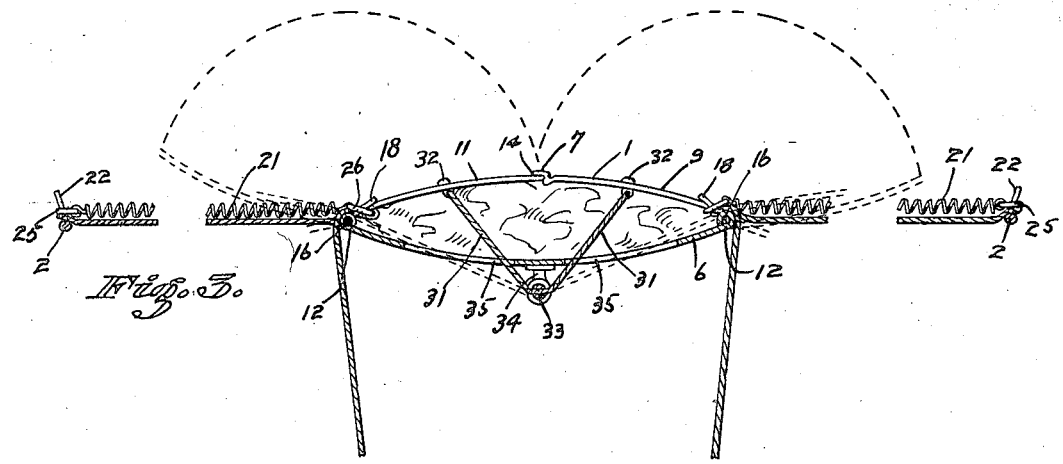
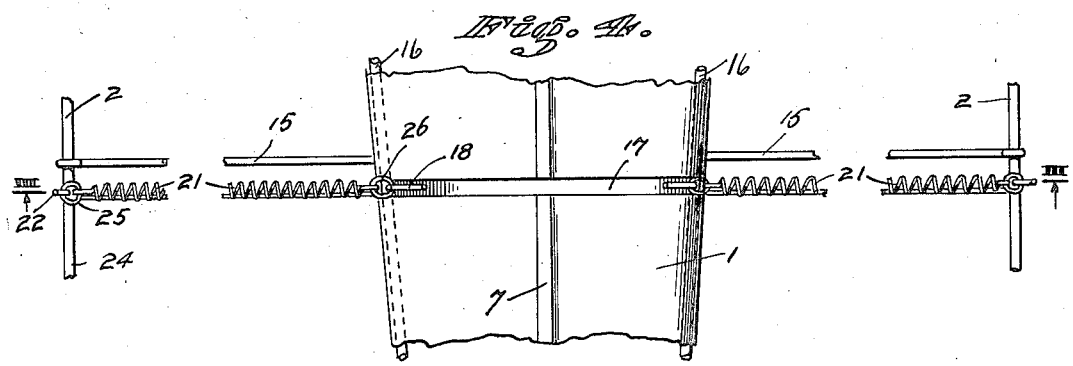
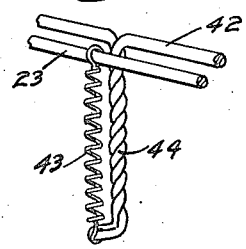
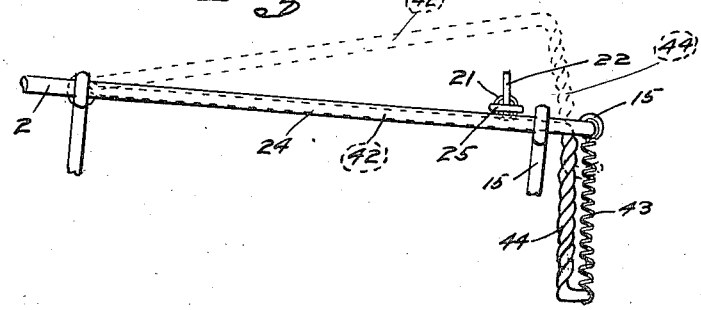
INVENTOR.
C. L. NEWMAN
BY
ATTORNEYS.

C. L. NEWMAN.
PARACHUTE.
APPLICATION FILED JUNE 11, 1921.
1,423,248.
Patented July 18, 1922.
3 SHEETS—SHEET 3.
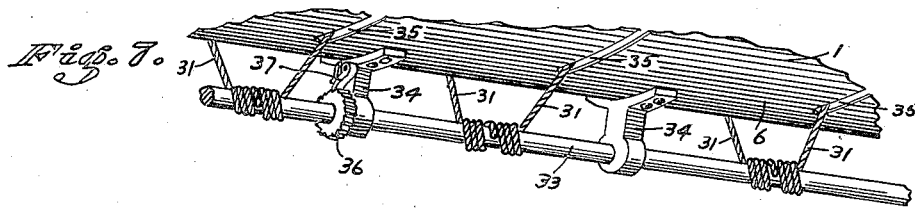
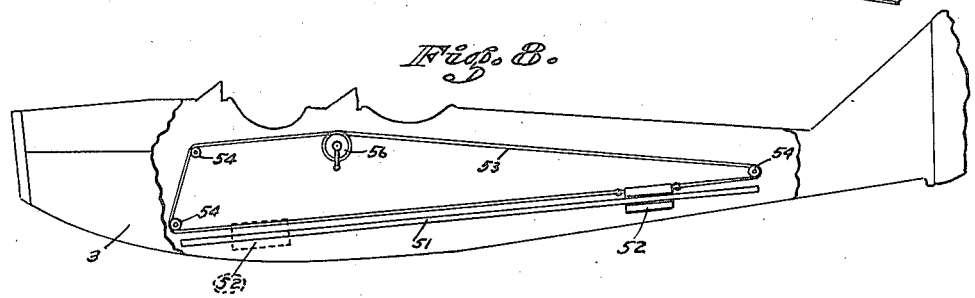
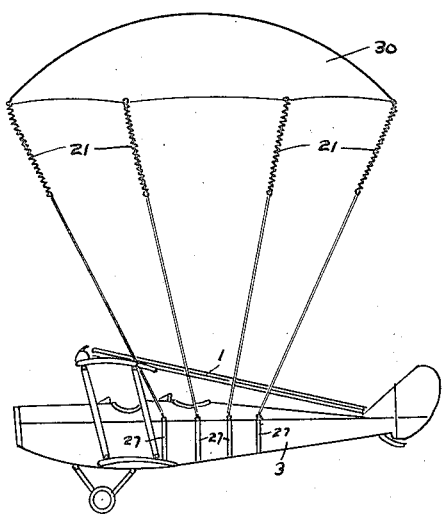
INVENTOR.
C. L. NEWMAN
BY
ATTORNEYS.

UNITED STATES PATENT OFFICE.

CHARLES L. NEWMAN, OF BERKELEY, CALIFORNIA.

PARACHUTE.

1,423,248.  Specification of Letters Patent.  Patented July 18, 1922.

Application filed June 11, 1921. Serial No. 476,738.

*To all whom it may concern:*

Be it known that I, CHARLES L. NEWMAN, a citizen of the United States, and resident of Berkeley, county of Alameda, and State of California, have invented a new and useful Parachute, of which the following is a specification.

The present invention relates to improvements in parachutes for aeroplanes and its object is to provide a parachute that may be connected to an aeroplane and serve to retard the fall of an aeroplane in case of an accident. My parachute is so constructed that it can be permanently secured to the aeroplane without seriously interfering with the operation of the same and that it can be put in action at any time by the release of a lock. Provision is further made to insure a proper unfolding of the parachute so that it is sure to spread immediately upon its release and to engage a sufficient amount of air to prevent any collapsing of the parachute. Special provision is made to secure a proper spreading of the parachute in case the plane is engaged in a nose dive or tail spin at the time the parachute is released. My device further provides for proper balancing means, by which the plane can be balanced, straightened out and brought into the right position for a proper landing after the parachute has been released, so that the pilot retains complete control over the machine even though his motor has stopped and his planes and all means of control have broken down.

Further objects and advantages will appear as the description proceeds.

The principles involved in my invention are embodied and reduced to practice in the preferred mechanism shown in the accompanying drawing, in which Figure 1 represents a side view of an aeroplane having my device attached to it, Figure 2 a plan view of the same plane, the right hand side being shown broken away, Figure 3 an enlarged cross-section through the plane along line 3—3 of Figure 4, parts being shown broken away, Figure 4 an enlarged detail plan view of a portion of the aeroplane, Figure 5 an enlarged detail side view of the rear portion of my device, showing the particulars of a spring-actuated lifting mechanism, Figure 6 a perspective detail view illustrating the spring action shown in Figure 5, Figure 7 an enlarged perspective view of a portion of my device showing the control of the same, Figure 8 a diagrammatic side view of an aeroplane having my balancing means attached thereto, and Figure 9 a side view of an aeroplane showing my parachute in active operation.

Referring to the drawings in detail, it will be seen that the most noticeable portions of my device are the parachute container (1) and the outrigger (2). The container is a box stretched along the top of the aeroplane, having substantially the outlines of the body (3) of the aeroplane and extending from the forward edge of the top plane to a place near the tail end of the aeroplane. It is secured to the latter in any desired manner, as for instance by the straps (4) secured to the body of the aeroplane and forming a saddle in which the box rests and to which it is bolted. I prefer to have the box of somewhat elliptical cross-section, as shown in Figure 4, comprising a solid lower portion (6) and a longitudinally divided upper portion (7), the two halves (9) and (11) of which are hinged to the lower portion as shown at (12), Figure 3. The two halves join at a central line and are provided along said line with convenient means for securing a snug fit between the two, as shown in the drawing at (14). The hinges comprise longitudinal rods (16) which are rotatably supported in the lower portion of the box and to which the covering halves are rigidly secured. The covers are provided with a plurality of registering transverse slots (17), (see Figure 4) and within those slots pins (18) are rigidly secured to the hinge rods, substantially parallel with the covers, but extending only through a small portion of their width. Both pins and covers being rigidly secured to the hinge rod, it will be understood that the box can be opened by proper action on the pins through which rotary motion is imparted to the hinge rod. This is done by the springs (21), which extend between said pins (18) and corresponding pins (22) secured to the outrigger (2). The latter is a rectangular frame having transverse frame members (23), substantially co-extensive with the span of the wings, and longitudinal frame members (24), substantially co-extensive with the length of the body from the front edge of the top wing to a convenient place near the tail end. This frame is secured to the body of the aeroplane in any desired manner, as by struts or braces (15). The springs (21)

are strong contraction springs and have rings (25) and (26) at their ends which can be slipped over the two pins. When the box is closed, the pin (18) slants inwardly, as shown in Figure 3, while the pin (22) slants slightly outwardly, so that the spring is held in its place by the diverging pins. The spring, having a tendency to contract, pulls on pin (18) and tends to thereby rotate the hinge rod and open the covers. The spring is sufficiently strong to do this but is normally held in check by locking means for the covers, which will be described later and the release of which enables the springs to open the covers.

The box referred to contains the parachute (30) which is placed in there in such a manner that it will open easily upon being released. The parachute itself is not different from the ones in common use and its edge is permanently secured to the various rings (26) normally disposed over the pins (18). Since the springs are secured at their other ends, through the rings (25), to the cables or ropes holding the parachute, the springs are practically made a part of these cables or ropes.

The free ends of the cables are secured to the body of the aeroplane, preferably through straps (27) carried clear around the body in different places, distributed, as nearly as possible, evenly around the center of gravity of the aeroplane. The slack in the cables is taken up by several windings back and forth between the pins (18) and (22).

Thus normally the parachute lies in the box, ready for use, its edge secured to the rings (26), the latter slipped over the pin (18) and attached to the springs (21), which are provided with other rings (26) at the other end. The latter rings are slipped over the pins (22) and attached to the cables, which, after being led back and forth between the two pins to take up any slack, are secured to the body of the plane. The covers of the box are held down by a locking device. As soon as the latter is released the springs (21) pull the pin (18) outward, thereby opening the box and giving freedom to the parachute which begins to rise immediately with reference to the aeroplane. The ring (26) is cleared of the pin (18) by the spring (21) as soon as the pin has turned sufficiently to allow the ring to slide off. But, and this is one of the principal parts of my invention, the ring (25) does not work itself free from the pin (22) until the parachute has risen considerably over the plane and has been spread by the springs (21), which means that the rings (25) do not work themselves loose until after the parachute has been properly spread and engaged a sufficient amount of air that a proper working of the same is assured.

Then the rings (25) slip off, the parachute slowly adjusts itself and has a firm hold on the body of the aeroplane, which now comes down easy and in safety.

The locking device repeatedly referred to consists of a cable (31) for each section of each cover, secured to a central part of its section, as shown at (32), and led through a slot (35) in the bottom of the box to a longitudinal shaft (33) rotatably secured underneath the box by brackets (34) extending downwardly from the same. Normally all these cables (31) are wound on this shaft against the resistance of the springs (21) and the shaft is locked against rotation by any desired means, preferably a ratchet wheel (36) and a pawl (37) as shown in Figure 7, which are provided on the shaft within convenient reach of the pilot. It will thus be seen that in case of danger the pilot only need to release the ratchet whereupon the springs (21) will automatically operate the parachute mechanism.

It is clear that the principal point in my invention is the stepwise spreading of the parachute, whereby the latter is forced to expand immediately upon its release and to thereby offer a large surface to the action of the air, thus eliminating the danger of immediate collapse of the parachute. But the means shown so far only refer to the lateral expansion and it is deemed expedient to also provide means whereby the immediate longitudinal expansion of the parachute is assured, no matter what position the aeroplane is in at the time the lock is released. Assuming, for instance, that the aeroplane at that time is engaged in a nose dive or tail spin, it would appear that the wind would have a tendency to strike the outside of the parachute rather than the inside and would thus tend to collapse the parachute rather than to expand it. To provide against this I use flaps (42) for the front and the rear end of the aeroplane, which consist of light frames hingedly secured at (45) and (46) between the outer longitudinal member of the outrigger and the box, as shown in Figure 2 and in detail in Figure 5. A plurality of transverse members (47) give body to the frame. Two of these flaps are secured in front and two in the rear. Both sets being substantially alike, I shall confine myself to the description of the ones in the rear. Each flap is somewhat smaller in dimensions than the corresponding outrigger, and is hinged so that its rear end is free to flop up and down. Normally it is confined to the plane of the outrigger, being supported by a contraction spring (43) depending from the rear member of the outrigger, centrally with reference to the flap, and engaging a downwardly extending arm (44) of the flap. The spring tends to throw the flap upward but normally cannot do so since the flap is confined in its position in the plane of the outrigger by one of the springs (21) stretched over it. However, as soon as this spring is removed, that is, as soon as the parachute is released, the spring (43) contracts and throws the flap upward as indicated in dotted lines in Figure 5, so as to allow the air to catch the inside of the parachute even if the aeroplane comes down straight vertically, tail end first. A similar provision is made for the front end as shown in Figure 2.

To be able to properly balance the aeroplane when it is suspended from the parachute, whereby a proper landing is assured even though all other means for controlling the plane have been destroyed, I provide a rod (51), Figure 8, at either side of the body of the aeroplane on which a weight (52) is slidably mounted. This weight can be controlled by a cable (53) which is led over various idler pulleys (54) and around a wheel (56) in operative proximity to the pilot's seat. By rotating this wheel the pilot can shift the center of gravity longitudinally and thereby to some extent control the actions of the aeroplane.

The operation of the device will be readily understood from the foregoing description. When the pilot, for some reason or other, loses control of his aeroplane, he will release the ratchet (36). The springs (21) immediately pull open the covers of the box, slip off the pin (18), draw the parachute apart toward the pins (22), then slip off the latter pins and allow the parachute to assume its natural position under the influence of the air supporting it and the weight carried. In slipping off of the pins (18) the springs (2) have freed the springs (43) and allowed the same to throw the flaps (42) upward just in time to strike the parachute being dragged over them by the springs (21) and to thereby lift the front or rear end of the parachute and assure their being caught by the air, even though the aeroplane at that time is in a straight vertical position, head down or tail down.

As the aeroplane slowly approaches the earth the pilot can straighten out its position by means of the weights (52).

I claim:

1. A parachute attachment for an aeroplane, comprising an outrigger secured to said aeroplane, a container for the parachute secured above the aeroplane, means for attaching the cords of the parachute to the body of the aeroplane and manually controlled spring means incorporated in the cords for opening the container and drawing the edge of the parachute toward the outlines of the outrigger before releasing the same.

2. A parachute attachment for an aeroplane, comprising an outrigger secured to said aeroplane, a container for the parachute secured above the aeroplane, means for attaching the cords of the parachute to the body of the aeroplane, a plurality of hinged covers for said container and manually controlled spring means incorporated in the cords for opening the covers and drawing the edge of the parachute toward the outlines of the outrigger before releasing the same.

3. A parachute attachment for an aeroplane, comprising an outrigger secured to said aeroplane, a container for the parachute secured above the aeroplane, means for attaching the cords of the parachute to the body of the aeroplane, and manually controlled spring means incorporated in the cords for opening the container and drawing the edge of the parachute toward the outlines of the outrigger before releasing the same, flaps hingedly secured transversely of the outrigger and normally confined in the plane of the same and spring means for throwing the extreme ends of said flaps upward when the parachute is released.

4. A parachute attachment for an aeroplane, comprising an outrigger secured to said aeroplane, a container for the parachute secured above the aeroplane, means for attaching the cords of the parachute to the body of the aeroplane, a plurality of hinged covers for said container and manually controlled spring means incorporated in the cords for opening the covers and drawing the edge of the parachute toward the outlines of the outrigger before releasing the same, flaps hingedly secured transversely of the outrigger and normally confined in the plane of the same and spring means for throwing the extreme ends of said flaps upward when the parachute is released.

5. A parachute attachment for an aeroplane, comprising an outrigger secured to said aeroplane, a container for the parachute secured above the aeroplane, means for attaching the cords of the parachute to the body of the aeroplane, and manually controlled spring means incorporated in the cords for opening the container and drawing the edge of the parachute toward the outlines of the outrigger before releasing the same, flaps hingedly secured transversely of the outrigger and normally confined in the plane of the same and spring means for throwing the extreme ends of said flaps upward when the parachute is released, and means for balancing the machine.

6. A parachute attachment for an aeroplane, comprising an outrigger secured to said aeroplane, a container for the parachute secured above the aeroplane, means for attaching the cords of the parachute to the body of the aeroplane, a plurality of hinged covers for said container and manually controlled spring means incorporated in the cords for opening the covers and drawing the edge of the parachute toward the outlines of the outrigger before releasing the same, flaps hingedly secured transversely of the outrigger and normally confined in the plane of the same and spring means for throwing the extreme ends of said flaps upward when the parachute is released, and means for balancing the aeroplane.

7. A parachute attachment for an aeroplane consisting of an outrigger comprising longitudinal members and transverse members, a longitudinal container for the parachute centrally secured within said outrigger having hinged covers thereon, spring connections between said covers and the longitudinal members of said outrigger being incorporated into the cords of the parachute and adapted to open the covers of the container, to draw the edge of the parachute toward the outlines of the outrigger and to then free themselves from the latter, and manually operated means for closing the container against the resistance of the springs.

8. A parachute attachment for an aeroplane consisting of an outrigger comprising longitudinal members and transverse members, a longitudinal container for the parachute centrally secured within said outrigger having hinged covers thereon, spring connections between said covers and the longitudinal members of said outrigger being incorporated into the cords of the parachute and adapted to open the covers of the container, to draw the edge of the parachute toward the outlines of the outrigger and to then free themselves from the latter, and manually operated means for closing the container against the resistance of the springs, flaps hingedly secured transversely of the outrigger and normally confined in the plane of the same, and spring means for throwing the extreme ends of said flaps upward when the parachute is released.

9. A parachute attachment for an aeroplane consisting of an outrigger comprising longitudinal members and transverse members, a longitudinal container for the parachute centrally secured within said outrigger having hinged covers thereon, spring connections between said covers and the longitudinal members of said outrigger being incorporated into the cords of the parachute and adapted to open the covers of the container, to draw the edge of the parachute toward the outlines of the outrigger and to then free themselves from the latter, and manually operated means for closing the container against the resistance of the springs, flaps hingedly secured transversely of the outrigger and normally confined in the plane of the same, and spring means for throwing the extreme ends of said flaps upward when the parachute is released, a plurality of weights slidably secured to the aeroplane adapted to longitudinally shift the center of gravity of the aeroplane and means for manually shifting said weights.

10. A parachute for an aeroplane comprising an outrigger operatively associated with the aeroplane and spring means introduced into the cords of the parachute operatively engaged by the outrigger for drawing the edge of the parachute toward the outlines of the outrigger before releasing the same.

CHARLES L. NEWMAN.